(12) United States Patent
Soundararajan et al.

(10) Patent No.: US 10,943,144 B2
(45) Date of Patent: Mar. 9, 2021

(54) WEB-BASED DATA EXTRACTION AND LINKAGE

(71) Applicant: GOOGLE LLC, Mountain View, CA (US)

(72) Inventors: Varun Soundararajan, Sunnyvale, CA (US); Anshul Kothari, Sunnyvale, CA (US); Anurag Agrawal, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 116 days.

(21) Appl. No.: 15/637,138

(22) Filed: Jun. 29, 2017

(65) Prior Publication Data

US 2018/0129905 A1 May 10, 2018

Related U.S. Application Data

(63) Continuation of application No. 14/246,421, filed on Apr. 7, 2014, now abandoned.

(51) Int. Cl.
*G06K 9/62* (2006.01)
*G06Q 30/02* (2012.01)
(Continued)

(52) U.S. Cl.
CPC .......... *G06K 9/623* (2013.01); *G06F 16/95* (2019.01); *G06F 16/9535* (2019.01);
(Continued)

(58) Field of Classification Search
CPC ............. G06F 16/9535; G06F 16/951; G06F 2221/2111; G06F 16/00; G06F 16/958;
(Continued)

(56) References Cited

U.S. PATENT DOCUMENTS

| 6,275,806 B1 | 8/2001 | Pertrushin |
| 6,684,249 B1 | 1/2004 | Frerichs et al. |

(Continued)

FOREIGN PATENT DOCUMENTS

| CN | 1552033 A | 12/2004 |
| CN | 101128819 A | 2/2008 |

(Continued)

OTHER PUBLICATIONS

Korean Notice of Office Action for app. No. 10-2016-7027997 dated Dec. 6, 2017.

(Continued)

*Primary Examiner* — Boris Gorney
*Assistant Examiner* — Bao G Tran
(74) *Attorney, Agent, or Firm* — Foley & Lardner LLP

(57) ABSTRACT

Systems and methods for automatically extracting a plurality of contact information from a resource, calculating prominence scores of each contact information, and associating a selected contact information with a content item are provided. A content item and a uniform resource locator are received from a content provider. A resource identified by the uniform resource locator is loaded. A plurality of contact information is detected from the loaded resource. For each of the detected contact information, a prominence score is calculated. One of the plurality of contact information is selected based on the calculated prominence scores. The selected contact information is associated with the content item.

20 Claims, 5 Drawing Sheets

(51) Int. Cl.
   *G06F 16/95*    (2019.01)
   *G06F 16/9535*  (2019.01)
   *G06F 16/955*   (2019.01)
   *G06Q 30/00*    (2012.01)

(52) U.S. Cl.
   CPC ......... *G06F 16/9566* (2019.01); *G06Q 30/00* (2013.01); *G06Q 30/0276* (2013.01)

(58) Field of Classification Search
   CPC .. G06F 40/205; G06F 16/335; G06F 16/9566; G06F 40/131; G06F 40/221
   See application file for complete search history.

(56) References Cited

U.S. PATENT DOCUMENTS

| | | | |
|---|---|---|---|
| 6,857,007 B1 | 2/2005 | Bloomfield | |
| 7,096,193 B1 | 8/2006 | Beaudoin et al. | |
| 7,139,728 B2 | 11/2006 | Rigole | |
| 7,428,497 B2 | 9/2008 | Agarwal et al. | |
| 7,853,255 B2 | 12/2010 | Karaoguz et al. | |
| 7,958,127 B2 | 6/2011 | Edmonds et al. | |
| 8,166,013 B2 | 4/2012 | Bandaru et al. | |
| 8,195,133 B2 | 6/2012 | Ramer et al. | |
| 8,238,540 B1 | 8/2012 | Duva et al. | |
| 8,386,386 B1 | 2/2013 | Zhu | |
| 8,483,372 B2 | 7/2013 | Park et al. | |
| 8,577,016 B1 | 11/2013 | Duva et al. | |
| 8,626,910 B1 | 1/2014 | Lientz | |
| 8,671,023 B2 | 3/2014 | Gelin | |
| 8,750,183 B2 | 6/2014 | Smith et al. | |
| 8,903,716 B2 | 12/2014 | Chen et al. | |
| 9,529,893 B1 | 12/2016 | Deng et al. | |
| 9,723,056 B1 | 8/2017 | Kuo et al. | |
| 2002/0120911 A1 | 8/2002 | Hino et al. | |
| 2002/0129011 A1* | 9/2002 | Julien | G06F 16/951 |
| 2002/0188606 A1 | 12/2002 | Sun et al. | |
| 2003/0050920 A1 | 3/2003 | Sun | |
| 2005/0076013 A1* | 4/2005 | Hilbert | G06Q 10/10 |
| 2006/0069613 A1 | 3/2006 | Marquardt | |
| 2006/0099931 A1* | 5/2006 | Trujillo | H04L 29/1216 455/412.1 |
| 2007/0097975 A1 | 5/2007 | Rakers et al. | |
| 2007/0112656 A1 | 5/2007 | Howe et al. | |
| 2007/0127688 A1 | 6/2007 | Doulton | |
| 2007/0168506 A1 | 7/2007 | Douglas et al. | |
| 2007/0198339 A1 | 8/2007 | Shen et al. | |
| 2007/0226057 A1 | 9/2007 | Laruelle et al. | |
| 2007/0230374 A1 | 10/2007 | Altberg et al. | |
| 2008/0133540 A1 | 6/2008 | Hubbard et al. | |
| 2009/0030755 A1 | 1/2009 | Altberg et al. | |
| 2009/0063406 A1 | 3/2009 | Golander et al. | |
| 2009/0119268 A1 | 5/2009 | Bandaru et al. | |
| 2009/0129571 A1 | 5/2009 | Altberg et al. | |
| 2009/0132632 A1 | 5/2009 | Jackson et al. | |
| 2010/0094860 A1 | 4/2010 | Lin et al. | |
| 2010/0169301 A1 | 7/2010 | Rubanovich et al. | |
| 2011/0087646 A1 | 4/2011 | Dalvi et al. | |
| 2011/0212704 A1 | 9/2011 | Preiss et al. | |
| 2011/0258049 A1 | 10/2011 | Ramer et al. | |
| 2012/0158484 A1 | 6/2012 | Bhatia | |
| 2012/0198056 A1 | 8/2012 | Shama et al. | |
| 2012/0265528 A1 | 10/2012 | Gruber et al. | |
| 2012/0265610 A1 | 10/2012 | Shama et al. | |
| 2013/0006771 A1 | 1/2013 | Parikh | |
| 2013/0086641 A1* | 4/2013 | Mehr | G06F 21/45 726/4 |
| 2013/0117022 A1 | 5/2013 | Chen et al. | |
| 2013/0275164 A1 | 10/2013 | Gruber et al. | |
| 2013/0276069 A1 | 10/2013 | Roberson et al. | |
| 2013/0304758 A1 | 11/2013 | Gruber et al. | |
| 2013/0306249 A1 | 11/2013 | Morton et al. | |
| 2014/0180811 A1 | 6/2014 | Boal | |
| 2014/0298460 A1 | 10/2014 | Xue et al. | |
| 2015/0046421 A1 | 2/2015 | Lisa et al. | |
| 2015/0172327 A1 | 6/2015 | Wansley et al. | |
| 2015/0278881 A1 | 10/2015 | Agrawal et al. | |
| 2015/0287099 A1 | 10/2015 | Soundararajan et al. | |
| 2016/0034946 A1 | 2/2016 | Agarwal et al. | |
| 2016/0294846 A1 | 10/2016 | Sharov et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0262545 A1 | 9/2017 | Qu | |
| 2017/0358301 A1 | 12/2017 | Raitio et al. | |

FOREIGN PATENT DOCUMENTS

| | | |
|---|---|---|
| CN | 101288093 A | 10/2008 |
| CN | 101295302 A | 10/2008 |
| CN | 101951376 A | 1/2011 |
| CN | 102663105 A | 9/2012 |
| CN | 102955854 A | 3/2013 |
| EP | 2 362 337 A1 | 8/2011 |
| JP | 2002-287673 A | 10/2002 |
| JP | 2007-148833 | 6/2007 |
| JP | 2009-525548 A | 7/2009 |
| JP | 2009-531739 | 9/2009 |
| JP | 2010-512579 A | 4/2010 |
| JP | 2010-198084 A | 9/2010 |
| JP | 2013-130955 A | 7/2013 |
| KR | 10-2000-0049799 A | 8/2000 |
| KR | 10-2006-0105362 A | 10/2006 |
| KR | 10-2009-0130364 | 12/2009 |
| KR | 1020090130364 | 12/2009 |
| KR | 10-2012-0034600 A | 4/2012 |
| WO | WO-01/71449 | 9/2001 |
| WO | WO-2006/074052 A1 | 7/2006 |
| WO | WO-2008/073701 | 6/2008 |
| WO | WO-2008/134207 A1 | 11/2008 |
| WO | WO-2009/156988 A1 | 12/2009 |
| WO | WO-2010/108157 | 9/2010 |
| WO | WO-2009/125495 A1 | 7/2011 |
| WO | WO-2013/142290 A1 | 9/2013 |

OTHER PUBLICATIONS

The Korean Intellectual Property Office Decision of Rejection for Application No. 10-2016-7029150 dated Jan. 29, 2018.
Examination Report for EP 15715065.7 dated Mar. 26, 2018.
"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
"Click to Text Ads in Beta? Text Message Ads" 4 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
"We Called it. Click-to-Text is Blowing up ADWords", Jun. 29, 2016.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Cooper,Jack, "AdWords targets SMS growth with new 'click to message' feature", May 26, 2016.
D'Onfro, Jillian, "Facebook just revealed how it will make money from messages", Sep. 22, 2015, Business Insider Inc.

(56) References Cited

OTHER PUBLICATIONS

Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Golgowski, Nina, "This Burger King Ad Is Trying to Control Your Google Home Device", Apr. 12, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
International Preliminary Report on Patentability on PCT/US2015/019950, dated Oct. 20, 2016.
International Preliminary Report on Patentability on PCT/US2015/022167, dated Oct. 4, 2016.
International Search Report & Written Opinion on PCT/US2015/019950 dated Jun. 17, 2015.
International Search Report and Written Opinion on GP-24611-00-PCT, dated Jan. 11, 2017.
International Search Report and Written Opinion on PCT/US2015/022167, dated May 12, 2015.
Koetsier, John, "Ads On Amazon Echo: Wendy's, ESPN, And Progressive Among Brands Testing", Forbes, May 11, 2017, 3 pages.
Larson, Selena "Google Home Now Recognizes your Individual Voice" dated Apr. 20, 2017, 3 pages.
Lee, Dave, "The five big announcements from Google I/O", BBC, May 18, 2017, 11 pages.
Nieva, Richard, "Google Home and eBay can tell you how much that's worth", 3 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, dated May 31, 2017, 6 pages.
Schwarts, Barry "Google AdWords testing click to SMS ad extension", Jun. 17, 2016, Third Door Media, Inc.
Seifert, Dan "Samsung's New Virtual Assistant Will Make Using Your Phone Easier", Mar. 20, 2017, 7 pages.
Sherr, Ian "IBM Built a Voice Assistant For Cybersecurity" dated Feb. 13, 2017, 4 pages.
Siegal, Daniel, "IP Attys Load Up Apps' Legal Challenges At Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Tran, et al. Spam Detection in Online Classified Advertisements, WebQuality '11, 7 pages, Mar. 28, 2011.
U.S. Notice of Allowance on U.S. Appl. No. 14/229,438 dated Dec. 22, 2015.
U.S. Notice of Allowance on U.S. Appl. No. 14/246,421 dated Dec. 1, 2015.
U.S. Office Action on U.S. Appl. No. 14/229,438 dated Jun. 19, 2015.
U.S. Office Action on U.S. Appl. No. 14/229,438 dated Nov. 12, 2014.
U.S. Office Action on U.S. Appl. No. 14/246,421 dated May 21, 2015.
U.S. Office Action on U.S. Appl. No. 14/246,421 dated Nov. 24, 2014.
U.S. Office Action on U.S. Appl. No. 14/246,421 dated Mar. 24, 2016.
U.S. Office Action on U.S. Appl. No. 14/246,421 dated Feb. 22, 2017.
U.S. Office Action on U.S. Appl. No. 14/246,421 dated Jun. 26, 2017.
U.S. Office Action on U.S. Appl. No. 14/879,999 dated Nov. 1, 2016.
U.S. Office Action on U.S. Appl. No. 15/055,182 dated Jul. 5, 2017.
Willens, Max, "For publishers, Amazon Alexa holds promise but not much money (yet)", Digiday, Jul. 6, 2017, 5 pages.
"Walmart and Google to offer voice-enabled shopping", BBC News, Aug. 23, 2017 (10 pages).
Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Korean Office Action for Application No. 10-2016-7029150 dated Jul. 6, 2017.
U.S. Office Action on U.S. Appl. No. 15/055,182 dated Sep. 18, 2017.
U.S. Office Action on U.S. Appl. No. 14/879,999 dated Aug. 11, 2017.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.

(56) References Cited

OTHER PUBLICATIONS

Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
Notice of Allowance on U.S. Appl. No. 15/055,182 dated Jul. 30, 2019 (5 pages).
CN Office Action for Appl. Ser. No. 201580016666.9 dated Mar. 5, 2019 (16 pages).
CN Office Action for Appl. Ser. No. 201580018473.7 dated Jan. 30, 2019 (19 pages).
Communication pursuant to Article 94(3) EPC for EP Appl. Ser. No. 15713078.2 dated Nov. 16, 2018 (7 pages).
Communication Pursuant to Article 94(3)EPC for Appl. Ser. No. EP 16787604.4 dated Jun. 14, 2019 (4 pages).
International Preliminary Report on Patentability for Appl. Ser. No. PCT/US2017/034247 dated Apr. 18, 2019 (13 pages).
KR Office Action for Appl. Ser. No. 10-2016-7027997 dated Aug. 29, 2018 (13 pages).
KR Office Action for Appl. Ser. No. 10-2016-7027997 dated Feb. 27, 2019 (8 pages)
KR Office Action for Appl. Ser. No. 10-2016-7027997 dated May 3, 2019 (13 pages).
Stackoverflow, "How do I stop Outlook from rendering an email address as a mail:to link?" asked and edited by Josh Kodroff, Jan. 22, 2010, accessed from: https://stackoverflow.com/questions/2110825/how-do-i-stop-outlook-from-rendering-an-email-address-as-a-mailto-link (13 pages).
U.S. Notice of Allowance for U.S. Appl. No. 15/055,182 dated Apr. 17, 2019 (8 pages).
U.S. Notice of Allowance for U.S. Appl. No. 15/055,182 dated Mar. 1, 2019 (8 pages).
U.S. Notice of Allowance for U.S. Appl. No. 15/288,921 dated May 8, 2019 (19 pages).
U.S. Office Action for U.S. Appl. No. 14/246,421 dated May 18, 2018 (14 pages).
U.S. Office Action for U.S. Appl. No. 14/879,999 dated Apr. 22, 2019 (2 pages).
U.S. Office Action for U.S. Appl. No. 14/879,999 dated Jul. 3, 2018 (13 pages).
U.S. Office Action for U.S. Appl. No. 14/879,999 dated Mar. 1, 2019 (10 pages).
U.S. Office Action for U.S. Appl. No. 15/055,182 dated Dec. 28, 2018 (15 pages).
U.S. Office Action for U.S. Appl. No. 15/055,182 dated Aug. 16, 2018 (15 pages).
Written Opinion of the International Preliminary Examining Authority for Appl. Ser. No. PCT/US2017/034247 dated Sep. 4, 2018 (11 pages).
International Search Report and Written Opinion of Appln. Ser. No. PCT/UC2017/034247 dated Aug. 7, 2017 (18 pages).
Notice of Allowance on CN Appln. Ser. No. 201580016666.9 dated Sep. 4, 2019 (6 pages).
Notice of Allowance on JP Appln. Ser. No. 2016-559320 dated Jul. 27, 2017 (3 pages).
Notice of Allowance on JP Appln. Ser. No. 2016-561320 dated Jan. 29, 2018 (5 pages).
Notice of Allowance on JP Appln. Ser. No. 2018-032942 dated May 20, 2019 (3 pages).
Summons to Attend Oral Proceedings for EP Appln. Ser. No. 15715065.7 dated Apr. 24, 2019 (18 pages).
Non-Final Office Action on U.S. Appl. No. 14/879,999 dated Sep. 17, 2019 (9 pages).
Notice of Allowance on U.S. Appl. No. 15/288,921 dated Sep. 16, 2019 (5 pages).
Notice of Reasons for Rejection for JP Appln. Ser. No. 2019-508214 dated Mar. 9, 2020 (6 pages).
First Office Action for CN Appln. Ser. No. 201911005329.6 dated Jul. 10, 2020 (14 pages).
Examination Report for EP Appln. Ser. No. 16787604.4 dated Mar. 4, 2020 (5 pages).
Examination Report for EP Appln. Ser. No. 17729601.9 dated Feb. 21, 2020 (12 pages).
First Office Action for CN Appln. Ser. No. 201680003784.0 dated Apr. 14, 2020 (20 pages).
Office Action for KR Appln. Ser. No. 10-2018-7022202 dated Apr. 22, 2020 (19 pages).
Second Office Action for CN Appln. Ser. No. 201680003784.0 dated Oct. 26, 2020 (15 pages).
Examination Report for IN Appln. Ser. No. 201947005658 dated Jan. 15, 2021 (7 pages).

\* cited by examiner

WEB-BASED DATA EXTRACTION AND LINKAGE

CROSS-REFERENCE TO RELATED APPLICATIONS

This application claims the benefit of priority under 35 U.S.C. § 120 as a continuation of U.S. patent application Ser. No. 14/246,421, filed Apr. 7, 2014, which is hereby incorporated herein by reference in its entirety.

BACKGROUND

In a computerized content delivery network, first-party content providers can provide information for public presentation of resources, such as web pages, documents, applications, and/or other resources. Additional third-party content can also be provided by third-party content providers for presentation on a user device together with the first-party content provided by the first-party content providers. Thus, a user viewing a resource can access the first-party content that is the subject of the resource as well as the third-party content that may or may not be related to the subject matter of the resource.

A third-party content provider may provide contact information to be presented along with a third-party content item. A user viewing the third-party content item may use the contact information to contact the third-party content provider.

SUMMARY

One implementation of the present disclosure is a computer-implemented method for extracting contact information from a resource and associating it with a content item. The method may be performed by a processing circuit. The method includes receiving a content item and uniform resource locator (URL) from a content provider, the URL identifying a resource. The method further includes loading the resource identified by the received URL and detecting a plurality of contact information from the loaded resource. The method further includes calculating a prominence score for each of the plurality of contact information and selecting one of the plurality of contact information based on the calculated prominence scores. The method further includes associating the selected contact information with the content item.

Another implementation of the present disclosure is a system for extracting contact information from a resource and associating it with a content item. The system includes a receiver configured to receive a content item and uniform resource locator (URL) from a content provider, the URL identifying a resource. The system further includes a loader configured to load the resource identified by the received URL. The system further includes a detector configured to detect a plurality of contact information from the loaded resource. The system further includes a scorer configured to calculate a prominence score for each of the plurality of contact information. The system further includes a selector configured to select one of the plurality of contact information based on the calculated prominence scores. The system further includes a linker configured to associate the selected contact information with the content item.

BRIEF DESCRIPTION OF THE DRAWINGS

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Figure 1:
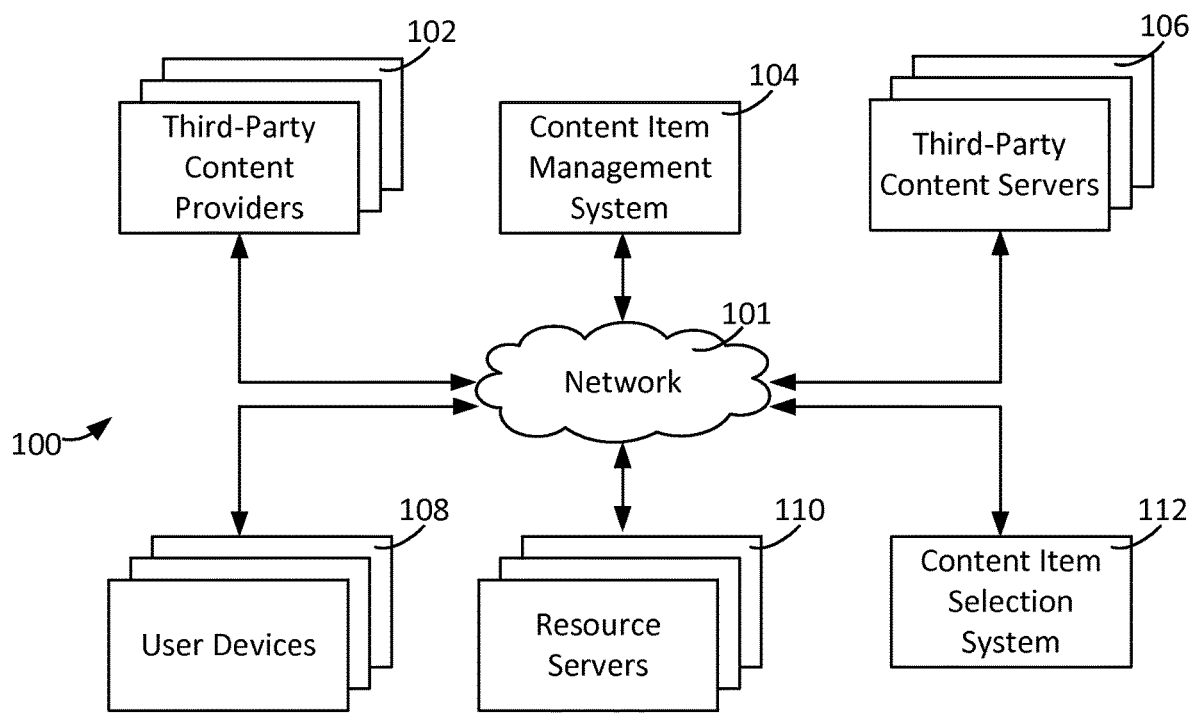
FIG. 1 is a block diagram of a computer system including a network, third-party content provider, content item management system, third-party content server, user devices, resource servers, and content item selection system, according to a described implementation.

FIG. 1 is a block diagram of a computer system 100 including a network 101, third-party content providers 102, content item management system 104, third-party content servers 106, user devices 108, resource servers 110, and content item selection system 112. The system 100 may be used to automatically extract contact information from a resource identified by a uniform resource locator (URL) provided by a content provider, such as the third-party content provider 102. The extracted contact information is associated with a content item also provided by the content provider. The resource identified by the URL may be a landing page of the content item that may be hosted on a resource server 110.

The system 100 may use at least one computer network such as the network 101. The network 101 may include a local area network (LAN), wide area network (WAN), a telephone network, such as the Public Switched Telephone Network (PSTN), a wireless link, an intranet, the Internet, or combinations thereof.

A third-party content provider 102 may be a computing device operated by a content provider. The computing device having a data processor may connect to the content item management system 104, third-party content servers 106, user devices 108, resource servers 110, and content item selection system 112 using the network 101. A third-party content provider 102 may also communicate with the content item management system 104 or user devices 108. A third-party content provider 102 may create or provide a content item, such as text, image, video, web page, or any other content item, to the content item management system 104. The third-party content may be associated with contact information which can be used by a user device 108 to contact the third-party content provider 102. The content item management system 104 may store the content item in the third-party content server 106. Contact information may be a phone number, mailing address, email address, fax number, video chat handle, instant messaging handle, social media profile, payment information, bank routing number, or any other contact information that provides information for interacting with the third-party. Contact information associated with a third-party content item can be displayed along with the content item or embedded within the content item when the content item is displayed to user devices, such that the users on the user devices can contact the third party content provider using the contact information. For instance, the third-party content provider 102 may provide a sales phone number with a content item that is displayed to users on user devices, so that users can call the third-party content provider on the sales phone number. The third-party content provider 102 may also provide a URL that is associated with the content item. The URL may reference a resource, such as a web page or a landing page, that is stored on a resource server 110.

In some implementations, the third-party content provider 102 may connect with the content item management system 104 to manage the selection and serving of content items by content item selection system 112. For instance, the third-party content provider 102 may set bid values and/or selection criteria via a user interface that may include one or more content item conditions or constraints regarding the serving of content items. A third-party content provider 102 may specify that a content item and/or a set of content items should be selected and served for user devices 108 having device identifiers associated with a certain geographic location or region, a certain language, a certain operating system, a certain web browser, etc. In another implementation, the third-party content provider 102 may specify that a content item or set of content items should be selected and served when the resource, such as a web page, document, an application, etc., contains content item that matches or is related to certain keywords, phrases, etc. The third-party content provider 102 may set a single bid value for several content items, set bid values for subsets of content items, and/or set bid values for each content item. The third-party content provider 102 may also set the types of bid values, such as bids based on whether a user clicks on the third-party content item, whether a user performs a specific action based on the presentation of the third-party content item, whether the third-party content item is selected and served, and/or other types of bids.

A content item management system 104 can be a data processing system. The content item management system 104 can include at least one logic device, such as a computing device having a data processor, to communicate via the network 101, for instance with third-party content providers 102, third-party content servers 106, user devices 108, resource servers 110, and content item selection system 112. The one or more processors may be configured to execute instructions stored in a memory device to perform one or more operations described herein. In other words, the one or more data processors and the memory device of the content item management system 104 may form a processing module. The content item management system 104 may be combined with third-party content servers 106, content item selection system 112, or a resource server 110 in to one or more computing device. For instance, a content item selection module may be part of a content item management system 104. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect extraction of contact information from a resource referenced by the URL provided by a third-party content provider 102. The processor may also process instructions to receive data via the network 101 and to provide data from the content item management system 112 to the third-party content providers 102. In addition to the processing circuit, the content item management system 110 may include one or more databases configured to store data. A data storage device may be connected to the content item management system 104 through the network 101. In operation, a content item management system 104 in accordance with the present disclosure receives a content item and a URL from a third-party content provider 102. The URL identifies a particular resource. The content item management system 104 loads the resource identified by the URL. A plurality of contact information are detected. A prominence score is calculated for each of the plurality of contact information. One of the plurality of contact information is selected based on the calculated prominence score, and the selected contact information is associated with the content item. The content item management system is described in greater detail in relation to FIG. 3.

The third-party content servers 106 can include a computing device, such as a server, configured to store third-party content items. The third-party content server 106 may directly or indirectly provide third-party content items to the content item management system 104, user devices 108, resource servers 110, content item selection system 112, and/or to other computing devices via network 101. The third-party content servers 106 may be a computer server (e.g., a file transfer protocol (FTP) server, file sharing server, web server, etc.), a combination of servers (e.g., a data center, a cloud computing platform, etc.). In some implementations, the third-party content servers 106 may be any type of memory device capable of storing third-party content provider data, user profile data, content item data, accounting data, auction data or any other type of data used by content item management system 104, the content item selection system 112, or another component of computer system 100. The third-party content servers 106 may include any type of non-volatile memory, media, or memory devices. For instance, third-party content servers 106 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, third-party content servers 106 are local to content item management system 104, content item selection system 112, or resource server 110. In other implementations, third-party content servers 106 are remote data storage devices connected with content item management system 104 and/or content item selection system 112 via network 101. In some implementations, third-party content servers 106 are part of a data storage server or system capable of receiving and responding to queries from content item management system 104 and/or content item selection system 112. In some instances, the third-party content servers 106 may be integrated into the content item management system 104 or the content item selection system 112. In some instances, third-party content items may be stored in a database of the content item management system 104 or the content item selection system 112. In some implementations, the third-party content providers 102 or the content item management system 104 may store new content items or delete old content items in the third-party content servers 106. In some implementations, the user devices 108, resource servers 110, and content item selection system 112 may request content items stored in the third-party content servers 106.

The content items that are stored in the third-party content servers 106 may be in any format that may be presented on a display of a user device 108, for instance, graphical, text, image, audio, video, etc. The content items may also be a combination or hybrid of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc.

A third-party content server 106 may have a plurality of third-party content items that are from, for instance, different third-party content providers. In some implementations, the third-party content provider 102, resource server 110 and/or the user device 108 can communicate with plurality of third-party content servers 106 and content item selection systems 112. The resource server 110 may alternate between multiple third-party content servers 106 or use a third-party content server 106 for specific content item slots of a web page.

User devices 108 may include any number and/or type of user-operable electronic devices. For instance, user devices 108 may include a desktop computer, laptop, smart phone, wearable device, smart watch, tablet, personal digital assistant, set-top box for a television set, smart television, gaming console device, mobile communication devices, remote workstations, client terminals, entertainment consoles, or any other devices configured to communicate with other devices via the network 101. Some user devices can be used to dial the content provider phone number, locate the address, or transfer funds using the payment information. User devices 108 may be capable of receiving resource from resource servers 110 and/or third-party content items from content item selection system 112, third-party content servers 106, and/or resource servers 110. The user device 108 may be any form of electronic device that includes a data processor and a memory. The memory may store machine instructions that, when executed by a processor, cause the processor to request a resource, load the resource, and request a content item. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The user device 108 can execute a software application (e.g., a web browser, a video game, a chat program, a mobile application, or other application) to request and retrieve resources and contents from other computing devices over network 101. Such an application may be configured to retrieve resources and first-party content from a resource server 110. The first-party content can include text, image, animation, video, and/or audio information. In some cases, an application running on the user device 108 may itself be first-party content (e.g., a game, a media player, etc.). The first-party content can contain third-party content or require the user devices to request third-party content from a third-party content server. User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.).

In some implementations, user devices 108 include an application (e.g., a web browser, a resource renderer, etc.) for converting electronic content into a user-comprehensible format (e.g., visual, aural, graphical, etc.). For instance, the user device 108 may execute a web browser application which provides a browser window on a display of the user device. The web browser application that provides the browser window may operate by receiving input of a uniform resource locator (URL), such as a web address, from an input device (e.g., a pointing device, a keyboard, a touch screen, or another form of input device) or from a memory element. In response, one or more processors of the user device 108 executing the instructions from the web browser application may request data from another device connected to the network 101 referred to by the URL address (e.g., a resource server 110). The computing device receiving the request may then provide web page data and/or other data to the user device 108, which causes visual indicia to be displayed by the display of the user device 108. Accordingly, the browser window displays the retrieved first-party content, such as web pages from various websites, to facilitate user interaction with the first-party content. User devices 108 may function as a user agent for allowing a user to view HTML encoded content. The third-party content can be displayed along with the first-party content. The third-party content may or may not be related to the subject matter of the first-party content. The third-party content can be provided to the user devices 108 and resource servers 110 by third-party content servers 106. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content item slot within which a third-party content item is presented.

In an illustrative instance, a user device 108 using a web browser can browse to a web page provided by a web page publisher. The web page publisher may be the first-party content provider and the web page may be the first-party content. The web page can be provided by a resource server 110. The user device 108 loads the web page which contains a third-party content item, such as an ad. In some implementations, the resource server 110 may receive an ad from an ad server and provide the ad with the web page to a user device. 108 The ad server may be a third-party content server 106. For instance, the web page publisher may provide search engine results and the ads may be provided with the search results. In other implementations, the web page may contain a link that either directly or indirectly references an ad server. For instance, as a web browser on a user device loads the web page, the user device requests the ad and receives it from the ad server. The ad server receives the ad from an content provider. The content provider may be a third-party content provider 106. The content provider may create or provide information to generate the ad. The ad may link to a landing page which can be another web page or resource. The link can be provided by the content provider. The ad can also contain content provider's contact information.

In some implementations, user devices 108 are capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item) by content item selection system 112 or by content item management system 104.

User devices 108 may generate a variety of user actions. For instance, user devices 108 may generate a user action in response to a detected interaction with a content item. The user action may include a plurality of attributes including a content identifier (e.g., a content ID or signature element), a device identifier, a referring URL identifier, a timestamp, or any other attributes describing the interaction. User devices 108 may generate user actions when particular actions are performed by a user device (e.g., resource views, online purchases, search queries submitted, etc.). The user actions generated by user devices 108 may be communicated to a click server, a content item management system 104 or a separate accounting system.

In some implementations, the system 100 may further comprise a click server. In some implementations, the click server may be part of the content item selection system 112, the content item management system 104, or another server connected to the network 101. In some implementations, the click server may be a separate server connected to the network 101. The click server receives a request from a user device 108 when the user interacts with the content item that the user device 108 receives from the content item selection system 112. For instance, a user may engage with a content item by selecting contact information that is provided along with the content item. The click server may receive the request and update a performance metric stored in the content item management system 104 or the third-party content server 106. For instance, the metric may be a user engagement with a content item. The performance metric may be stored in association with the provided third-party content item in the third-party content server 106. The click server may redirect the user device 108 to a resource that is stored in a resource server 110, wherein the resource may be the landing page that is identified by the URL provided by the third-party content provider 102.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content item from the content server that may be more relevant to the user. In addition, certain data may be treated (e.g., by content item selection system 112) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content item selection system 112.

The resource servers 110 can include a plurality of computing devices. A computing device may be a server, configured to host a resource, such as a web page or other resource (e.g., articles, comment threads, music, video, graphics, search results, information feeds, etc.). The resource server 110 may be a computer server (e.g., a file transfer protocol (FTP) server, file sharing server, web server, etc.) or a combination of servers (e.g., a data center, a cloud computing platform, etc.). One resource server 110 can provide resource data or other content (e.g., text documents, PDF files, and other forms of electronic documents) to the user device 108, and another resource server 110 can provide the resource referenced by a URL provided by a third-party content provider along with a content item. For instance, one resource server can host a publisher web page or a search engine, and another resource server can host a resource such as a landing page referenced by an content provider; in some instances, one resource server 110 may host both resources. A first-party content provider can provide first-party content to a resource server 110. The resource server 110 may request a third-party content server 106 for third-party content and transmit the received third-party content to a user device 108 along with the first-party content. In one implementation, the user device 108 can access the resource server 110 via the network 101 to request data to effect presentation of a resource of the resource server 110. In one implementation, the content item management system 104 can access another resource server 110 via the network 101 to request the resource referenced by the URL provided by a third-party content provider 102.

Resources provided by the resource server 110 may include any type of information or data structure that can be provided over network 101. In some implementations, resources may be identified by a resource address associated with the resource server 110 (e.g., a URL). Resources may include web pages (e.g., HTML web pages, PHP web pages, etc.), word processing documents, portable document format (PDF) documents, images, video, programming elements, interactive content, streaming video/audio sources, or other types of electronic information. Resources provided by the resource server 110 may be web pages, local resources, intranet resources, Internet resources, or other network resources. In some implementations, resources include one or more web pages to which user devices 108 are directed (e.g., via an embedded hyperlink) when user devices 108 interact with a third-party content item provided by a content item selection system 112. Resources may contain references, such as hyperlinks, to other resources or web pages. For instance, a first-party content may contain links to other first-party content in a same URL domain or subdomain. In another instance, a third-party content item may contain references to other resources or web pages.

The content item selection system 112 can include at least one logic device, such as a computing device having a data processor, to communicate via the network 101, for instance with a third-party content provider 102, content item management system 104, third-party content server 106, user devices 108, and/or resource servers 110. In some implementations, the content item selection system 112 may include third-party content servers 106. The content item selection system 112 can include a server, such as a content item server or otherwise.

In one implementation, a content item selection system 112 can receive, via the network 101, a request for a content item. The received request may be sent from a resource server 110, a user device 108, and/or any other computing device in the system 100. The resource server 110 may be owned or operated by a first-party content provider. The resource server 110 or the resource may include instructions for one or more content item selection systems 112 to provide third-party content items with one or more resources of the first-party content provider on the resource server 110. In one implementation, the resource may include a web page. The user device 108 may be a computing device operated by a user (represented by a device identifier), which, when accessing a resource of the resource server 110, can make a request to a content item selection system 112 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords associated with the requested resource, text of the content of the resource, a title of the resource, a category of the resource, a type of the resource, etc.). The information that the content item selection system 112 receives can include a HyperText Transfer Protocol (HTTP) cookie which contains a device identifier (e.g., a random number) that represents the user device 108.

In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 112 to select third-party content items to be served with the requested resource and presented on a display of a user device 108.

In some instances, the request for content item may be part of a web page or other resource (such as, for instance, an application) that includes one or more content item slots in which a selected and served third-party content item may be displayed. The code (e.g., JavaScript®, HTML, etc.) defining a content item slot for a web page or other resource may include instructions to request a third-party content item from the content item selection system 112 to be presented with the web page. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

Content item selection system 112, when selecting and serving third-party content items for presentation with requested resources via the Internet or other network, may be controlled or otherwise influenced by a third-party content provider 102 that utilizes a content item management system 104. For instance, a third-party content provider 102 may specify selection criteria (such as keywords) and corresponding bid values that are used in the selection of the third-party content items. The bid values may be utilized by the content item selection system 112 in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider 102 may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system 112 uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, content item selection system 112 may determine one or more performance metrics for the third-party content items and the content item management system 104 may provide indications of such performance metrics to the third-party content provider 102 via a user interface. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, or watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used. The various performance metrics may be measured before, during, or after content item selection, content item presentation, user click, or user engagement. In some implementations, performance metrics may be measured by a click server.

The content item selection system 112 may select a third-party content item to serve with the resource based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system 112 through an auction.

During an auction for a content item slot for a resource, such as a webpage, content item selection system 112 may utilize several different types of bid values specified by third-party content providers 102 for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior instance, the value or score for a bid based on whether the third-party content item is selected and served may be $0.005*1.00=0.005 and the value or score for a bid based on whether a user performs a specific action may be $5*0.002=0.01. To maximize the income generated, the content item selection system 112 may select the third-party content item with the highest value from the auction. In the foregoing instance, the content item selection system 112 may select the content item associated with the bid based on whether the user performs the specific action due to the higher value or score associated with that bid.

Once the content item selection system 112 selects a third-party content item, data to effect presentation of the third-party content item on a display of the user device 108 may be provided to the user device 108 using a network 101. The user on the user device 108 may select or click on the provided third-party content item. In some instances, a URL associated with the third-party content item may reference another resource, such as a web page or a landing page. In other instances, the URL may reference back to the content item selection system 112, a third-party content server 106, or an content item management system 104. One or more metrics are updated, such as a click-thru or engagement, and the user device is redirected to a resource, such as a web page or a landing page, that has been provided by a third-party content provider 102 along with the third-party content item.

Figure 2:
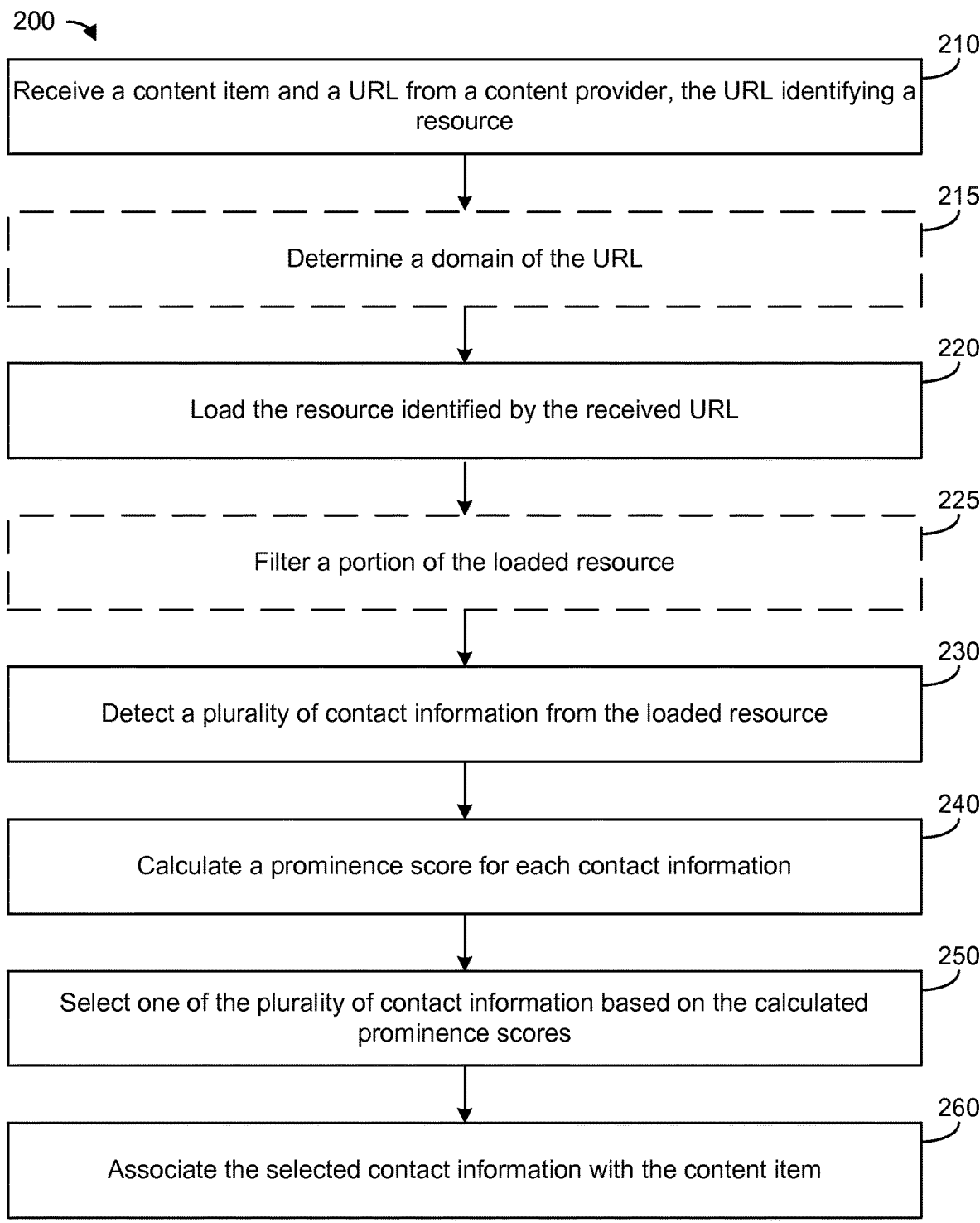
FIG. 2 is a flowchart of one implementation of a process for extracting contact information from a resource and associating it with a content item.

FIG. 2 is a flowchart of one implementation of a process for extracting contact information from a resource and associating it with a content item. In brief overview, the method generally includes receiving a content item and a URL from a content provider, the URL identifying a resource (step 210), loading the resource identified by the received URL (step 220), and detecting a plurality of contact information from the loaded resource (step 230). The method also includes calculating a prominence score for each contact information (step 240), selecting one of the plurality of contact information based on the calculated prominence scores (step 250), and associating the selected contact information with the content item (step 260). The method may optionally include determining a domain of the URL (step 215), shown in phantom view, and filtering a portion of the loaded resource (step 225), shown in phantom view. In other implementations, these steps can be performed in a different order.

Still referring to FIG. 2, and in more detail, the method includes receiving a content item and a URL from a content provider, the URL identifying a resource (step 210). In some implementations, the content item is associated with the URL. For instance, the resource identified by the URL may be the landing page of the content item. The content item and the URL may be sent from a third-party content provider 102 and received at the content item management system 104. In some implementations, only the URL is received and the content item is generated from the resource identified by the received URL. For instance, the resource referenced by the URL may be loaded, and various elements from the resource may be combined to generate the content item. In some implementations, only the content item is received and the content item contains the URL.

The URL may reference a resource that is hosted on a resource server 110 or the third-party content provider 102. The received URL may identify a resource that is a web page or a landing page for the received content item. The resource may be maintained by the third-party content provider 102. The content item may be a content item of a product, a service, a promotion, a coupon, etc. that is offered on the resource by the third-party content provider 102. For instance, the third-party content provider 102 may be an online retailer, the resource may be a web page of the online retailer, and the content item may be a content item for the web page.

As shown in FIG. 2, the method optionally includes determining a domain of the URL (step 215). A domain of the URL can be identified by parsing the URL as a text string. In some implementations, the URL may be parsed to identify the domain of the URL. Regular expressions, text searching, pattern recognition, and other means known in the art may be used to identify a domain of the URL.

In some implementations, the domain is a root domain. In other implementations, the domain is a subdomain. For instance, the URL may be https://sub.example.com, in which "example" is the root domain and "sub" is the subdomain. Some URLs may have multiple levels of subdomains. In some implementations, a plurality of domains may be determined, each domain of a different domain level. For instance, a root domain and a subdomain of the URL may be determined. In some implementations, one of the domains is selected based on the number of resources available in each domain. In some implementations, one of the domains is selected based on the type of the domain.

In some implementations, one of the domains of the URL is selected based on comparing the domains to a list of domains. The list of domains may be stored in the content item management system 104, content item selection system 112, resource server 110, or any other component in the computer system 100. Each level of the domain in the URL may be compared against the list of domains. In some implementations, the root domain may be compared first and the sub domains may be compared in the order of domain level. In some implementations, the lowest level domain may be compared first, and higher level domains may be compared in reverse order of domain level. The list of domains may store domains that may comprise subdomains that are controlled by multiple organizations or users. For instance, the list may include example.com, where example.com may have subdomains parent1.example.com and parent2.example.com, each subdomain controlled or owned by a different organization or user. The method may include selecting a domain from one of the root domain or one or more subdomain such that the selected domain does not appear in the list of domains. For instance, the received URL may be parent1.example.com. The root domain, example.com, may be compared against the list of domains first. The root domain is found in the domain and so it is not selected. The subdomain, parent1.example.com, is compared against the list of domains. The subdomain may not be found in the list of domains, and so the subdomain is selected.

In some implementations, one of the domains is selected based on looking up the organization or user controlling the one or more domains in the URL. A domain that is of the highest level controlled by only one organization or user may be selected. The organization or user of each domain may be stored in content item management system 104, content item selection system 112, resource server 110, or any other component in the computer system 100. For instance, the organization controlling the root domain example.com may be determined to be Example Inc., and the organization controlling the subdomain parent1.example.com may be determined to be Parent1 Inc. Another subdomain under the root domain may be found that is controlled by a different organization, such as parent2.example.com. In response, the subdomain parent1.example.com may be selected over the root domain example.com.

In some implementations, the method may include selecting the lowest level domain. If no contact information is extracted from loaded resources, or if no contact information is selected from a plurality of contact information, then a higher level domain may be selected. This process can repeat until the root domain is reached.

The domain may be used to find a plurality of URLs under the domain, each plurality of URL identifying a resource that is less than a predetermined number of arcs from the resource identified by the received URL. An arc is a link or a reference from one resource to another resource. For instance, a web page may include a hyperlink to another web page. The predetermined number of arcs may be set to limit the maximum distance in links from the resource identified by the received URL, thereby limiting the number of contact information that are detected from a plurality of resources referenced by the plurality of URLs. For instance, if the predetermined number of arcs is set to 1, the plurality of URLs would include the received URL and one or more URLs that are referenced by the resource identified by the received URL. In some implementations, the resource identified by the received URL is loaded first, and if no contact information is detected, each resource identified by the plurality of URLs may be loaded and contact information may be detected from each resource. If no contact information is detected in the resources with a distance in links of 1, then a plurality of resources are loaded with a distance in links of 2. The distance is increased until the predetermined number of arcs specifying the maximum distance in links is reached, until contact information is detected, or until contact information with a prominence score above a threshold score is detected.

In some implementations, a web crawler or a bot may crawl or navigate to the received URL and find a plurality of URLs under the domain. For instance, a web crawler may load the resource referenced by the received URL and find one or more URLs in the resource. The web crawler may then load one or more resources referenced by the one or more URLs, and find another set of URLs in each of the one or more resources. This repeats a predetermined number of times, corresponding to the predetermined number of arcs.

In some implementations, a database or a memory element stores the plurality of URLs. The database or a memory element may be part of a search engine, the content item management system 104, a third-party content server 106, or a content item selection system 112. The database or a memory element may be queried with the domain and the predetermined number of arcs to retrieve the plurality of URLs. For instance, the database may store a directed graph of a plurality of URLs under a domain, the nodes in the directed graph representing URLs under the domain, and the arcs representing links between the resources identified by the URLs.

As shown in FIG. 2, the method further includes loading the resource identified by the received URL (step 220). The content item management system 104 may request the resource from a resource server 110 hosting the resource. The resource server 110 may in response send the resource to the content item management system 104. In some implementations, the resource is loaded as a text string into memory, for instance as a HyperText Markup Language (HTML) file. In other implementations, the resource may be parsed into an object tree and rendered as a web page.

For instance, the resource may be parsed into an object tree, such as a document object model (DOM) tree. The DOM tree may be a hierarchical model of a particular resource. The DOM tree may include image information (e.g., image URLs, display positions, display sizes, alt text, etc.), font information (e.g., font names, sizes, effects, etc.), color information (e.g., RGB color values, hexadecimal color codes, etc.) and text information for the resource.

In another instance, the resource may be rendered to create a snapshot image of the resource. The snapshot image may be a visual representation of a particular resource. The snapshot image may illustrate the visual appearance of the resource as presented on a user interface device (e.g., an electronic display screen, a computer monitor, a touch-sensitive display, etc.) after rendering the resource. The snapshot image may include color information (e.g., pixel color, brightness, saturation, etc.). In some implementations, the snapshot image may be a picture file having any viable file extension (e.g. .jpg, .png, .bmp, etc.).

In some implementations, the resource may contain references to other content items, such as images, that are rendered on the web page. In some implementations, the other content items referenced are not loaded or rendered. For instance, the other content item may be content items, which are not loaded or rendered with the web page. In implementations where a plurality of URLs under the domain is found, a plurality of resources identified by the plurality of URLs may be loaded into memory. Each of the plurality of resources may be stored in a resource server 110 that stores the resource identified by the received URL or in a different resource server 110 whose Internet Protocol address resolves to the same domain.

As shown in FIG. 2, the method optionally includes filtering a portion of the loaded resource (step 225). In some implementations, an identified portion of the resource may be filtered by deleting a portion of the resource that is loaded into memory. For instance, in implementations that load the text of the resource into memory, portions of the text of the resource are deleted in memory. In another instance, in implementations that parse the resource into an object tree, nodes corresponding to the filtered portions are deleted in memory. In some instances, the locations of the filtered portions of the resource are stored in a list or in another data structure. In implementations where a plurality of resources is loaded, a portion of each of the plurality of resources may be filtered. In some implementations, an entire resource may be filtered. In some implementations, no portion of a resource is filtered. In some implementations, the filtered portion may correspond to a third-party content item or content item. The third-party content item may be detected by finding a tag or a node that indicates a corresponding portion of the loaded resource as a third-party content item.

The filtered portion may be user content, i.e. content that is authored by a visitor or a user of a web page rather than the publisher or host of the web page. For instance, some web pages may have comments sections where any user may write his own comments. These comments sections may be detected by searching through the loaded resource. In some implementations, a tag or a node of the loaded resource may indicate that a corresponding portion of the resource is a comment. In some implementations, a comment may be detected by finding a time or date signature with a username, located in proximity to a portion of the loaded resource which is identified as a comment. The proximity may be determined by analyzing the loaded resource, such as by parsing a Cascading Style Sheets (CSS) or rendering the resource as a web page. In some implementations, a comment or a comment section may be detected finding a third-party commenting system embedded in the second resource. In some implementations, a username or a signature associated with the username may be detected to reoccur in the plurality of second resources. Content proximate to the username or the signature may be filtered.

As shown in FIG. 2, the method further includes detecting a plurality of contact information from the loaded resource (step 230). In detecting the plurality of contact information, the filtered portions of loaded resource are ignored. For instance, a potential contact information may be in a comment section of a web page, in which case the potential contact information is not detected as one of a plurality of contact information. In implementations where the locations of the filtered portions are stored in a list, any potential contact information that is found on the resource is checked against the list. If a potential contact information is located in a position specified in the list, the potential contact information is not selected as one of a plurality of contact information. In some implementations, contact information may be detected from a hidden portion of the resource. A hidden portion of a resource may be specified by a tag or a node of the resource. In implementations where the resource is loaded as text into memory, regular expressions, pattern recognition, and other text search can be used to find the plurality of contact information. In implementations where a resource may be parsed into an object tree and rendered, contact information may be detected from the rendered resource via, for instance, optical character recognition. In implementations where a plurality of resources are loaded, the plurality of contact information may be an aggregation of all contact information that are detected in each of the plurality of resources. The filtered portions of each of the plurality of resources may be ignored. In some implementations, detecting a plurality of contact information includes extracting a plurality of contact information.

Contact information of the third-party content provider 102 can be detected in the resource or the plurality of resources. Contact information may be a phone number, a mailing address, email address, fax number, video chat handle, instant messaging handle, social media profile, payment information, bank routing number, or any other contact information. In some implementations, a predetermined type of contact information may be detected. For instance, only phone numbers may be detected from the resource. In another instance, only phone numbers and mailing addresses may be detected from the resource. In yet another instance, any type of contact information may be detected. Different sets of rules may be used to detect the contact information depending on the type of contact information. For instance, one set of rules may be used to detect a phone number, and another set of rules may be used to detect a mailing address. In some implementations, a plurality of contact information may be detected in one portion of the web page. For instance, an address may be proximate to a phone number in the resource.

The set of rules for detecting different types of contact information may be implemented as modules. A set of rules may be used in detecting a phone number, mailing address, an email, a fax number, a video chat handle, an instant messaging handle, a payment information, a bank routing number, or a social media profile. For instance, detecting a video chat handle may comprise searching a resource for an embedded Uniform Resource Identifier (URI).

The set of rules to detect a phone number is described in further detail. In some implementations, various conventions and formats may be taken into account when detecting contact information. A phone number convention may specify whether or not a potential contact information is a valid phone number. A phone number format may specify various common ways in which a phone number is written. For instance, in the United States and other North American Numbering Plan countries, a telephone number may comprise ten digits, where the first three digits are an area code. The area code may be placed inside brackets or the area code may be separated from the other four numbers with a dash or a period. A prefix number, 1, may be included with the ten digits. For instance, a resource may contain a number comprising ten digits where the first three digits are separated by a dash. The number may then be detected as contact information. In some implementations, the conventions and formats for multiple countries and regions may be applied. For instance, a phone number in India is also ten digits. In detecting the phone number from the resource or the plurality of resources, if a potential phone number has ten digits, then it is compared against the set of rules for U.S. phone numbers as well as the set of rules for India phone numbers.

In some implementations, a country code top-level domain of the URL may be detected from the URL to determine which set of rules to use to detect contact information. For instance, if the country code top-level domain of the URL is ".us" then a phone number adhering to the set of rules for U.S. phone number may be detected as contact information. In some implementations, the domain name may be resolved to an Internet Protocol (IP) address, which can then be used to find the geo-location of the resource servers 110. In some implementations, the location of the user device 108 may be determined. A geo-location can be used to determine which set of rules to use to detect contact information. For instance, if a geo-location indicates that the resource server 110 or the user device 108 is located in northern California, a set of rules for detecting phone numbers in U.S. may be used. In another instance, a set of rule detecting phone numbers in the U.S. with area codes corresponding to the northern California may be used.

The set of rules to detect a mailing address is described in further detail. A mailing address may comprise one or more of country, postal code, county, state, city, town, village, city area, district, street, street number, unit number, company name, or any other parts of a mailing address. A mailing address convention may specify the order of different parts of the mailing address as well as acronyms, abbreviations, prefixes, and suffixes. One or more parts of an address may be found by searching the text of the resource using regular expressions, pattern recognition, and other text search. For instance, a regular expression search may find a five-digit or a nine-digit zip code for an address in the United States. Other parts of the address may be detected close to the found part of the mailing address. For instance, a state abbreviation, such as CA for California, may be found to precede the found zip code. In some implementations, the object tree of the resource may be used to find the mailing address. A tag or a node of the object tree may indicate an embedded map. For instance, an iframe tag with a src attribute set to a link to a map web site may indicate that a map is embedded in the resource. A mailing address may be detected within the tag or node, or proximate to the tag or node.

As shown in FIG. 2, the method includes calculating a prominence score for each contact information of the plurality of contact information (step 240). This results in a calculation of a plurality of prominence scores. A prominence score of contact information may be calculated by searching for one or more signals associated with the contact information. For each signal associated with contact information, a signal score may be calculated. Signals may be of different types. Different types of signals may be found by one or more of: searching through the loaded text of the resource, analyzing the object tree or CSS of the resource, or analyzing the OCR of the rendered resource. For instance, the DOM or the snapshot image of the loaded resource may be used to find the one or more signals and calculate the signal scores.

In some implementations, a type of signal is a number of times the contact information is detected on the resource. For instance, a phone number may be shown several times on a web page. The number of times contact information appears on the resource may be proportional to a signal score. In some implementations, the plurality of contact information holds duplicates, such that number of times contact information is stored in the plurality equals the number of times the contact information appears in the resource. In some implementations, the plurality of contact information does not hold duplicates, such that the loaded resource is searched for a specific contact information to determine the number of times that specific contact information appears in the resource.

In some implementations, a type of signal is a number of other contact information on the resource. For instance, a phone number may be the only contact information on the web page. The number of other contact information on the resource may be inversely proportional to a signal score.

In some implementations, a type of signal is a number of other contact information of the same type as the contact information associated with the signal. For instance, a signal score of the phone number in the web page may be the number of other phone numbers in the web page. The number of other contact information of the same type as the contact information associated with the signal may be inversely proportional to a signal score. For instance, if a web page has a phone number and an email address and there are no other phone numbers in the web page, the signal score may be a maximum signal score value for this type of signal.

In some implementations, a type of signal is a textual emphasis of the contact information in the resource. The textual emphasis may include a font size, bold, italic, oblique, underline, color, contrast, blinking, etc. In some implementations, a type of signal is a relative textual emphasis of the contact information compared to the surrounding contents in the resource. For instance, a web page may include a phone number of font size 16, and the text surround the phone number may be of font size 12. In another instance, a web page may include a phone number in bold and a surrounding text that is not in bold. In instances where the contact information is detected from the text of the loaded resource, the textual emphasis may be detected from a tag or a node of the object tree or a corresponding portion of the CSS. In instances where the contact information is detected from the rendered resource, the textual emphasis may be detected by analyzing the rendered resource, such as using OCR on the snapshot image.

In some implementations, a type of signal is a location of the contact information within the resource. Some locations within the resource have a higher signal score compare to other locations within the resource. For instance, a phone number located at the top of a web page may have a higher signal score than another phone number located at the bottom of the web page. The location of the contact information may be determined by using the rendered resource such as the snapshot image, or by using the object tree.

In some implementations, a type of signal is based on content proximate to the contact information within the resource. The content proximate to the contact information may be graphical, text, image, audio, video, etc. The content proximate to the contact information may be found using the object tree or the rendered resource. For object trees, a content may be proximate to contact information if the content is a parent, a sibling, or in the same node as the contact information. For rendered resources, a content may be proximate to the contact information if the content is within a predetermined spatial distance or adjacent to the contact information in the snapshot image. The spatial distance may be, for instance, an absolute distance or relative spatial distance as compared to a dimension of the snapshot image. For instance, a content may need to be within 100 pixels within contact information to be considered proximate. In another instance, a content may need to be within 10% of the relative distance compared to a width of the rendered snapshot. After the content proximate to the contact information is found, the content may be used to determine a signal score. For instance, text "fax" may be found proximate to one phone number, and text "call" may be found proximate to another phone number. The phone number next to the word "fax" may have a lower signal score than the phone number next to the word "call." The word "fax" may indicate that the content provider does not intend to be called on the corresponding phone number, and the word "call" may indicate that the content provider does intend to be called on the corresponding phone number.

In some implementations, the received content item may be considered in determining a signal score based on a content proximate to the contact information within the resource. For instance, the resource may contain a phone number next to the word "service" and another phone number next to the word "sales." If the received content item includes the text "Call our sales representatives today!", then the phone number next to the word "sales" may have a higher signal score. If the received content item includes the text "Call for service", then the phone number next to the word "service" may have a higher signal score.

In some implementations, one or more keywords associated with the received content item may be considered in determining a signal score based on a content proximate to the contact information within the resource. The keywords may be used to select a content proximate to the contact information within the resource. For instance, the content item may be associated with a keyword "limousine." A phone number may be next to the word "limo service" in the rendered resource. The signal score may be higher for content that matches exactly with the keyword and for content that is closer in spatial distance.

In some implementations, one or more of the content provider data, content item data, accounting data, auction data, or any other type of data may be considered in determining a signal score based on the content proximate to the contact information within the resource. For instance, if content provider data specifies that the content provider is a pizza delivery restaurant, a phone number next to the word "for delivery" may have a high signal score. In another instance, if content provider data specifies that the content item is for a Black Friday sale, a phone number next to the words "Call for specials on Black Friday Sale!" may have a high signal score.

In some implementations, a type of signal is based on a prominence of a content proximate to the contact information within the resource. The content proximate to the contact information may be graphical, text, image, audio, video, etc. The prominence of the content may be determined by other types of signals of the content, such as location, size, relative size compared to the resource, color, contrast, etc. For instance, the content proximate to the contact information may be an image specified by a HTML img tag, and the phone number may be in the alt text attribute of the img tag. In another instance, the contact information may be part of the image and detected from the rendered resource.

A prominence score of contact information can be calculated from the one or more signal scores. Signal scores may be weighted, scaled, or normalized based upon the type of signal, type of content item, or content provider data. For instance, each signal score may be scaled such that signal scores of different signal types may have a same range of possible values. The one or more signal scores may be combined or summed to a prominence score. For instance, a prominence score of a phone number may be calculated by combining the signal scores based on location, textual emphasis, and content proximate to the phone number. In some implementations, the prominence score is a weighted sum of the signal scores. In some implementations where a plurality of resources are loaded, a prominence score associated with a contact information may be weighted based on the number of arcs from the resource identified by the received URL to the resource that contains the contact information. For instance, a first phone number may be detected on the landing page, and a second phone number may be detected on a web page that is linked from the landing page. The prominence score for the first phone number may be multiplied by one weight value, such as one, while the second phone number may be multiplied by another weight value, such as 0.5. In some implementations, the weight value of a prominence score may be a decreasing function of the number of arcs from the resource identified by the received URL. For instance, the function may be an exponential decay or linear decay function. The prominence score of each contact information may be associated with the corresponding contact information. For instance, a memory element may store each prominence score with the corresponding contact information. In another instance, each prominence score may store a reference or a pointer to an associated contact information.

As shown in FIG. 2, the method includes selecting one of the plurality of contact information based on the calculated prominence scores (step 250). In some implementations, the method includes selecting one of the plurality of contact information associated with the highest prominence score as compared to other prominence scores of the plurality of contact information. The contact information referenced by or associated with the selected prominence score is selected among the plurality of contact information. In some implementations, the method includes selecting contact information of a specific type that has the highest prominence score as compared to other prominence scores associated with contact information of the specific type. For instance, a phone number associated with a highest prominence score among other phone numbers may be selected.

In some implementations, the method may include selecting a set of contact information based on the calculated prominence scores. The set of contact information may be selected from the plurality of contact information. For instance, the plurality of contact information may include five phone numbers, and the set of contact information may include three of the five phone numbers. In some implementations, a filter may be applied to the plurality of prominence scores, such that any prominence scores above a predetermined threshold value is selected. Each contact information corresponding to a selected prominence score may be selected as part of a set of contact information. In some implementations, a set of contact information is selected based on the type of contact information and the prominence scores. For instance, every phone number above a specified prominence score may be selected.

In some implementations, the content provider is provided with the set of contact information, such that the content provider may select one or more of the set of contact information. In some implementations, the content provider is provided with the plurality of contact information, such that the content provider may select one or more of the plurality of contact information. In some implementations, the plurality of contact information or the set of content information is provided in a descending order to the content provider such that the content information associated with the highest prominence score is displayed first. The content provider may select one or more contact information to associate with the content item.

As shown in FIG. 2, the method further includes associating the selected contact information with the content item (step 260). In some implementations, the selected contact information is first extracted from a resource and then associated with the content item. In some implementations, the selected contact information is embedded in the content item. The selected contact information may be stored with the content item in the third-party content server 106.

In some implementations, a descriptor may be associated with each contact information. For instance, a descriptor may specify the type of contact information, such as phone number. In another instance, a descriptor may specify the geographical region of the contact information. In some implementations, a descriptor may be content from the loaded resource proximate to the contact information associated with the descriptor. For instance, a phone number may be proximate to the text "Call us at," which is stored as a descriptor. In some implementations, the descriptor and the contact information may be embedded in the content item. In implementations where a set of contact information is selected, the set of contact information may be embedded in the content item. Each contact information in the set of contact information may be associated with a descriptor, such that a set of descriptors may be embedded in the content item. The content item with the associated contact information may be stored in the third-party content server 106.

When the content item selection system 112 determines during an auction that a content item stored on the third-party content server 106 should be served to the user device 108, the content item is served together with the contact information associated with the content item. The contact information may be displayed with the content item at the user device 108. The contact information may also be embedded in the content item such that a user on a user device 108 can contact the content provider by clicking or interacting with the content item. For instance, a user device 108 may be a smartphone, a content item may be a content item, and contact information may be a phone number for the content provider. The descriptor associated with the contact information may be displayed with the content item. For instance, the descriptor may store the text "Call us at," which is displayed next to the contact information. In some implementations where a set of contact information is associated with the content item, one or more contact information may be displayed with the content item. For instance, the content item may be displayed with a phone number and an email address. In some implementations, the geographical location of the user device 108 is used to determine which of the contact information is displayed. For instance, one contact information may be a local phone number associated with Sunnyvale, Calif., with an area code of "408", and another contact information may be a toll-free 1-800 phone number. If the user device 108 is determined to be near Sunnyvale such that a call can be made to the local phone number without long distance calling charges, then the local phone number may be displayed with the content item. Otherwise, the toll-free phone number may be displayed with the content item. In some implementations, the type of user device 108 or the capabilities of the user device 108 may be used to determine whether or how contact information is displayed. For instance, if the user device 108 is a smartphone or a desktop capable of making phone calls, a button may be displayed with the content item such that clicking on the button may call the content provider by dialing a phone number associated with the content item. In another instance, clicking on the button may add the content provider to an address book or a contacts list with the phone number associated with the content item. If the user device 108 is a desktop device that is incapable of making phone calls, the phone number may be displayed only as text and not as a clickable button. In another instance, if the user device 108 is capable of displaying geographical maps, a button may be displayed with the content item such that clicking on the button may bring up a map with a mailing address of the content provider. In some implementations, one or more buttons are displayed along with the content item.

In some implementations, the content item selection system 112 may generate a link to a click server and transmit the link with the content item to a user device 108. On the user device 108, the link to a click server can be displayed as a way to contact the third-party content provider or to navigate to the resource identified by the URL, such as a landing page. For instance, the link may be displayed as a way to call a phone number to an content provider. When a user clicks on the link, the user device may send a request to the click server. The click server may log a metric, such as engagement, with the content item and store the metric in the content item management system 104. The click server may then send an instruction back to the user device 108 to contact the third-party content provider 102 via the contact information associated with the content item. For instance, the click server may send instructions to the user device 108 to dial the phone number provided with the content item. In another instance, the click server may send an instruction back to the user device 108 to open a new email message or send a SMS text message or use any other application to contact or locate the third-party content provider 102 via the contact information. The click server may also redirect the user device 108 to the resource identified by the URL.

Figure 3:
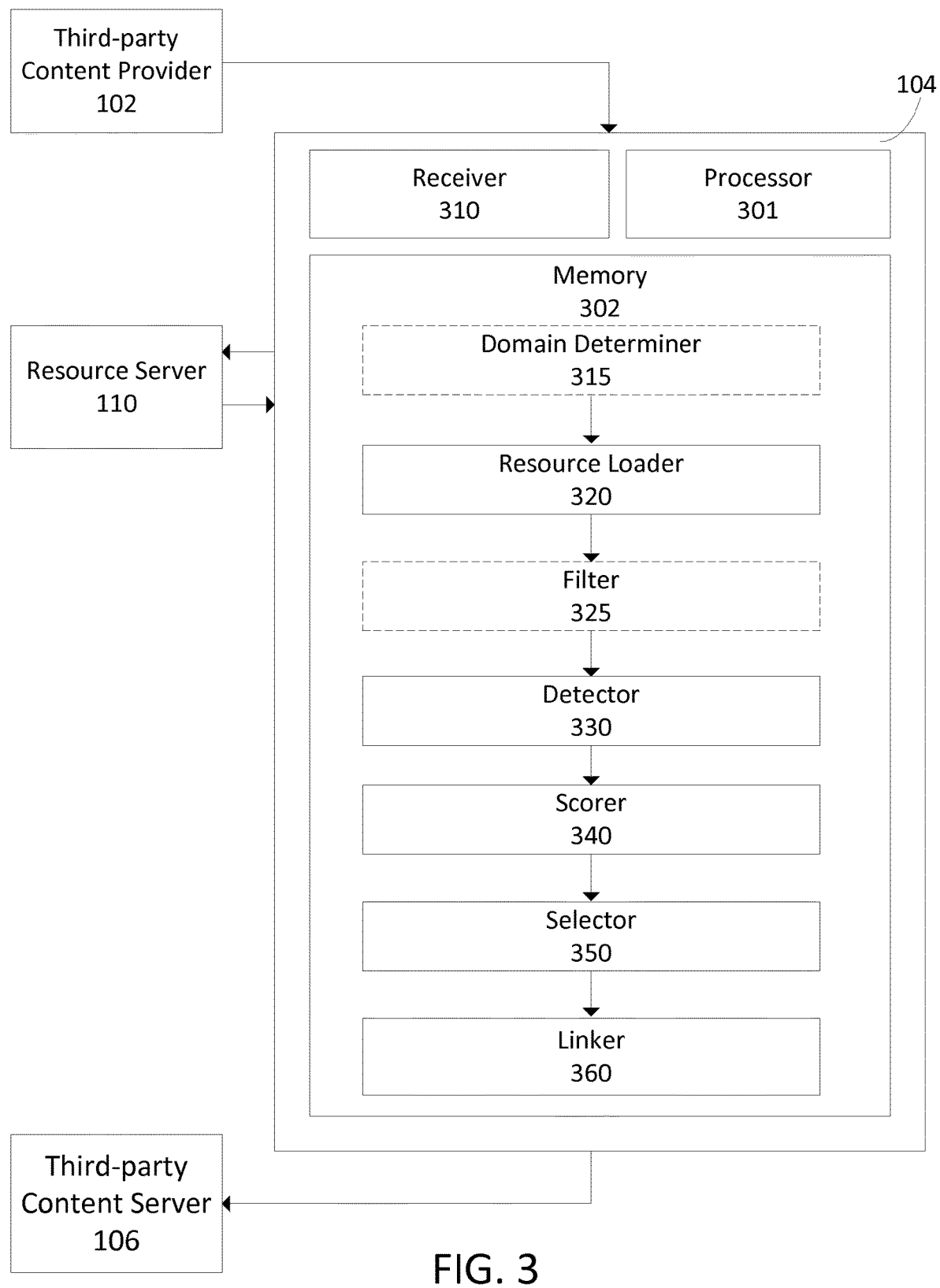
FIG. 3 is a block diagram illustrating one implementation of the content item management system of FIG. 1 in greater detail.

FIG. 3 is a block diagram illustrating one implementation of the content item management system 104 of FIG. 1 in greater detail, shown to include a receiver 310, a processor 301, and memory 302. The receiver 310 may be a communication interface that includes wired or wireless interfaces (e.g., jacks, antennas, transmitters, receivers, transceivers, wire terminals, Ethernet ports, WiFi transceivers, etc.) for conducting data communications with local or remote devices or systems via the network 101. For instance, the receiver 310 may allow content item management system 104 to communicate with third-party content provider 102, third-party content server 106, resource server 110, and other components of computer system 100. In some implementations, the receiver may have a corresponding module or software that works in conjunction with hardware components. The receiver 310 may receive from a third-party content provider 102 a content item and a URL. The receiver 310 may transmit the received content item and URL to a module in memory such as to the domain determiner 315 or the resource loader 320.

The processor 301 may be implemented as a general purpose processor, an application specific integrated circuit (ASIC), one or more field programmable gate arrays (FPGAs), a CPU, a GPU, a group of processing components, or other suitable electronic processing components. The processor 301 may be connected directly or indirectly to the memory 302 and the receiver 310. The processor 301 may read, write, delete, or otherwise access data stored in memory 302 or other components. The processor 301 may execute instructions stored in memory 302.

Memory 302 may include one or more devices (e.g., RAM, ROM, flash memory, hard disk storage, etc.) for storing data and/or computer code for completing and/or facilitating the various processes, layers, and modules described in the present disclosure. Memory 302 may include volatile memory or non-volatile memory. Memory 302 may include database components, object code components, script components, or any other type of information structure for supporting the various activities and information structures described in the present disclosure. In some implementations, memory 302 is communicably connected to processor 301 and includes computer code (e.g., data modules stored in memory 302) for executing one or more processes described herein. In brief overview, memory 302 is shown to include an optional domain determiner 315, a resource loader 320, an optional filter 325, a detector 330, a scorer 340, a selector 350, and a linker 360.

Still referring to FIG. 3, memory 302 is shown to include an optional domain determiner 315. The domain determiner 315 determines a domain of the received URL. The domain may be a root domain or a subdomain. The domain determiner 315 may parse the URL as a text string. In some implementations, the domain is used to find a plurality of URLs under the domain, each plurality of URL identifying a resource that is less than a predetermined number of arcs from the received URL. A web crawler or a bot may be used to determine the plurality of URLs. In some implementations, a memory element stores the plurality of URLs. In some implementations, the domain determiner 315 is part of the resource loader 320.

Still referring to FIG. 3, memory 302 is shown to include a resource loader 320. The resource loader 320 may communicate with the receiver 310 to load the resource identified by the received URL. In some implementations, the resource loader 320 may communicate with the domain determiner 315 to receive a plurality of URLs. The resource loader 320 may load a plurality of resources, each resource identified by the plurality of URLs. In some implementations, resource loader 320 loads a resource as a text string into memory. In some implementations, resource loader 320 may comprise a parser and a renderer. The parser may parse a resource into an object tree and the renderer may render the resource using the object tree.

Still referring to FIG. 3, memory 302 is shown to optionally include a filter 325. The filter 325 may filter a portion of the loaded resource. In some implementations, the filter 325 may filter a portion of each resource of the plurality of loaded resources. The filter 325 may filter out portions of the loaded resource that correspond to user comments or other content items. In some implementations, the filtered portions of a resource may be deleted from memory 302. In some implementations, the location of the filtered portions of a resource may be stored in a data structure.

Still referring to FIG. 3, memory 302 is shown to include a detector 330. The detector 330 may detect plurality of contact information from the loaded resource or the plurality of loaded resources. The detector 330 may not detect contact information from filtered portions of the loaded resource. The detector 330 may detect contact information from a hidden portion of the loaded resource. The detector 330 may use a different set of rules to extract different types of contact information. The set of rules may be implemented as a function, a class, a library, a module, an application programming interface (API), or other software, on a hardware, or a server. In some implementations, the detector 330 detects contact information by searching or parsing through the text of a resource. In some implementations, the detector 330 detects contact information from a rendered resource. In some implementations, the detector 330 uses portions of the URL or IP addresses to determine which set of rules to use to detect different types of contact information. In some implementations, the detector 330 extracts the plurality of contact information.

Still referring to FIG. 3, memory 302 is shown to include a scorer 340. The scorer 340 calculates a prominence score for each contact information of the plurality of contact information. A prominence score of contact information may be calculated by searching for one or more signals associated with the contact information. A signal score is calculated for each signal, and one or more signal scores are combined to calculate the prominence score associated with the contact information. Signals may be different types and found by searching the text of the resource, analyzing the object tree or CSS of the resource, or analyzing the OCR of the rendered resource. In some implementations, a type of signal may be a number of times the contact information is detected on the resource, a number of other contact information on the resource, a number of other contact information of the same type as the contact information associated with the signal, a textual emphasis of the contact information in the resource, a location of the contact information within the resource, content proximate to the contact information within the resource, prominence of a content proximate to the contact information within the resource, etc.

Still referring to FIG. 3, memory 302 is shown to include a selector 350. The selector 350 selects one or more contact information from the plurality of contact information based on the calculated plurality of prominence scores. In some implementations, the selector 350 selects contact information associated with the highest prominence score. In some implementations, the selector 350 selects a set of contact information, each selected contact information associated with a prominence score above a predetermined threshold. In some implementations, the selector 350 provides one or more contact information to the third-party content provider 102 through the receiver 310. The third-party content provider 102 may then select one or more of the provided contact information and sends the selection to the selector 350 through the receiver 310.

Still referring to FIG. 3, memory 302 is shown to include a linker 360. The linker 360 may associate the one or more selected contact information with the content item. The selected contact information may be embedded in the content item. The selected contact information may be stored with the content item in the third-party content server 106. In some implementations, a descriptor may be associated with the contact information. The descriptor may be embedded in the content item and stored in the third-party content server 106.

Figure 4A:
FIGS. 4A, 4B, and 4C are illustrative web pages under a domain displaying a plurality of contact information.
Figure 4B:
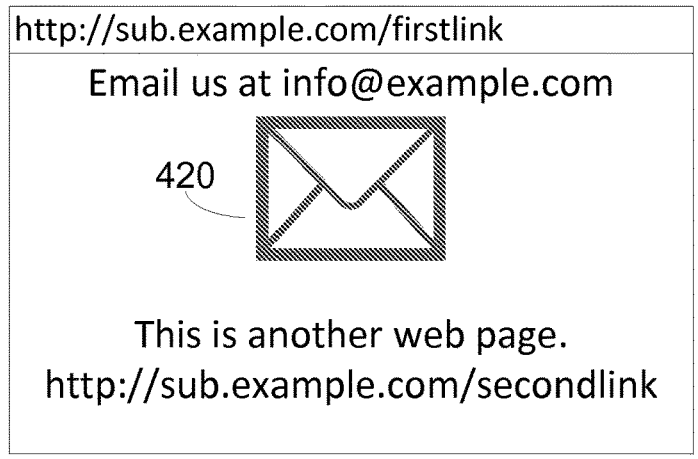
Figure 4C:

FIGS. 4A, 4B, and 4C are illustrative web pages under a domain displaying a plurality of contact information. A third-party content provider 102 may provide the content item management system 104 with the URL of "http://sub.example.com/contact" and a content item for a text ad, the content item comprising "Our Sales Reps are standing by!" FIG. 4A is an illustrative web page identified by the URL. The web page may comprise two contact information: a sales phone number 410 and a service phone number 411. One or more signals may be used when a prominence score is calculated for the sales phone number 410. One signal for the sales phone number 410 may be the number of times the sales phone number 410 appears on the web page. Here, the sales phone number 410 appears twice on the web page, increasing the signal score associated with this type of a signal relative to a phone number that appears only once on the web page, such as the service phone number 411. Another signal for the sales phone number 410 may be the number of other contact information that appear on the web page. Here, not counting the duplicate sales phone number, there is one other phone number that appears on the web page, which is the service phone number 411; thus, the signal score for this type of signal may be relatively lower compared to a signal for contact information detected on a web page that does not contain any other contact information. Another signal for the sales phone number 410 may be the textual emphasis. The sales phone number 410 appears in a bold text the first time it appears in the web page. The signal score for this type of signal may thus be higher relative to a phone number that is not displayed in bold, such as the service phone number 411. Another signal for the sales phone number 410 may be the location within web page. The sales phone number 410 is located at the top of the web page the first time it appears in the web page. The signal score may thus be higher relative to a phone number that appears at the bottom of the web page, such as the service phone number 411. Another signal for the sales phone number 410 may be the font size. The font size of the sales phone number 410 is bigger relative to surrounding text. Thus the signal score may be higher relative to a phone number that is smaller than surrounding text, such as the service phone number 411. Another signal for the sales phone number 410 may be the content proximate to the sales phone number 410. Here, the sales phone number 410 is close to the text "Sales," which matches with the provided content item of "Our Sales Reps are standing by!" Thus, the signal score for this type of signal may be relatively higher than for a phone number close to the text "service," such as the service phone number 411. The one or more signal scores for the sales phone number 410 may be combined to calculate a prominence score for the sales phone number 410. One or more signal scores for the service phone number 411 may also be combined to calculate a prominence score for the service phone number 411. In this illustrative instance, the prominence score for the sales phone number 410 may be 100 and the prominence score for the service phone number may be 49.

The web page illustrated in FIG. 4A may also comprise a link to another web page with a URL of http://sub.example.com/firstlink, which is illustrated in FIG. 4B. The web page illustrated in FIG. 4B may comprise an email address and a URL of http://sub.example.com/secondlink, which is illustrated in FIG. 4C. In implementations where more than one resources are loaded, a domain of the received URL is determined. Here, the domain may be example.com or sub.example.com. As described in relation to step 220 of FIG. 2, in some implementations, one or more additional resources are loaded if they are identified by links from the resource identified by the received URL. In some implementations, a predetermined number of arcs may limit the maximum distance in links from the resource identified by the received URL. In this illustration, if the predetermined number of arcs is set to 0, then only the web page illustrated in FIG. 4A may be loaded. If the predetermined number of arcs is set to 1, then the web pages illustrated in FIGS. 4A and 4B may be loaded. If the predetermined number of arcs is set to 2, then the web pages illustrated in FIG. 4A-4C may be loaded.

The contact information in the web page illustrated by FIG. 4B may be an email address. A prominence score for the email address may be computed using one or more signals. One signal that may be used to calculate the prominence score is the prominence of an image 420 proximate to the email address. Here, the email may have a prominence score calculated in part by the prominence score of the image 420, which is based on the location of the image and the size of the image. The prominence score of the email may also be scaled based on the distance in links from the landing page. In this illustrative instance, the prominence score for the email may be 50.

The contact information in the web page illustrated by FIG. 4C may be support phone number 430. The prominence score the support phone number 430 may be based on the signal scores based on the textual emphasis of the support phone number 430, location of the support phone number 430 within the web page, and the font size of the support phone number 430. However, the prominence score of the support phone number 430 may be relatively low as compared to the sales phone number 410 in FIG. 4A, as the prominence score of the support phone number 430 may be scaled by an exponential decay factor dependent on the distance in links of two. In this illustrative instance, the prominence score for the support phone number may be 25.

Figure 5:
FIG. 5 is a block diagrams illustrating a plurality of contact information detected from the web pages in FIG. 4A-4C with calculated prominence scores.

FIG. 5 is a block diagrams illustrating a plurality of contact information detected from the web pages in FIG. 4A-4C with calculated prominence scores. In some implementations, one contact information may be selected if it is associated with the highest prominence score as compared to each other prominence score associated with the plurality of contact information. In some implementations, more than one contact information may be selected. In some implementations, more than one contact information of different types may be selected. For instance, one phone number and one email address may be selected. In this illustrative instance, a phone number 501 with the highest prominence score among all other phone numbers may be selected and an email 502 with the highest prominence score among all other emails may be selected. In some implementations, all contact information above a predetermined threshold 510 may be selected. In this illustrative instance, the predetermined threshold may be set to 49, and a phone number 501 and an email address 502 may be selected.

Figure 6A:
FIGS. 6A and 6B are illustrative content items displayed with contact information.
Figure 6B:

FIGS. 6A and 6B are illustrative content items displayed with contact information. The content items may be displayed on user devices 108, and based on the capabilities or applications on the user devices 108, different contact information may be displayed with the content items. For instance, a user device 108 may be able to call a phone number but may not be able to send emails. The content item illustrated in FIG. 6A may be displayed on such user device 108, such that a button 640 is provided such that when the user clicks on the button 640, a call is dialed to the phone number 620. Apart from the button 640, the content item may also display the phone number 620, the email 630, and the URL 610. Another user device 108 may be capable of calling a phone number and sending emails. The content item illustrated in FIG. 6B may be displayed on such user device 108, such that one button 641, when clicked by a user, calls the phone number 621 and another button 651, when clicked by a user, opens an email application or sends an email to the content provider. The content item may also display the phone number 621, the email 631, and the URL 611.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's user device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A system for web-based data extraction and linkage, comprising:
    a data processing system including one or more processors, the data processing system to:
    receive a content item and uniform resource locator (URL) from a content provider computing device, the URL identifying a webpage;
    load the webpage identified by the URL;
    detect a plurality of contact information from the webpage, the plurality of contact information comprising a first contact information and a second contact information;
    parse the webpage to determine, prior to association of contact information with the content item, a prominence score for each of the plurality of contact information based on one or more signals associated with the plurality of contact information obtained via an analysis of an object tree of the webpage or an analysis of a result of optical character recognition of the webpage, wherein the one or more signals is based on:
        a number of times the respective contact information is shown on the loaded webpage;
        a number of other contact information detected on the loaded webpage;
        a typographic emphasis of a respective contact information;
        a location of the contact information within the loaded webpage; and
        a text located near the respective contact information within the loaded webpage;
    select the first contact information and the second contact information of the plurality of contact information based on the prominence score for each of the plurality of contact information;
    associate the selected first contact information and the second contact information with the content item;
    receive, via speech input from a computing device, a request;
    select, based on location information associated with the computing device, one of the first contact information or the second contact information;
    modify the content item to indicate the one of the first contact information or the second contact information selected based on the location information associated with the computing device; and
    provide the content item to the computing device to cause the computing device to generate audio output comprising the content item to indicate, via the audio output, the one of the first contact information or the second contact information selected based on the location information associated with the computing device, the computing device to dial a number of the content provider computing device with the one of the first contact information or the second contact information responsive to input from the computing device.

2. The system of claim 1, wherein the computing device comprises a digital assistant, the system to:
    receive the speech input from the digital assistant.

3. The system of claim 1, wherein the computing device dials the number of the content provider computing device responsive to a selection.

4. The system of claim 1, wherein the computing device dials the number of the content provider computing device responsive to audio feedback.

5. The system of claim 1, comprising the one or more processors to:
    modify, for presentation via a second computing device, the content item to include the one of the first contact information or the second contact information with a selectable button for the content item; and
    serve the content item with the selectable button to the second computing device responsive to the request, the second computing device configured to dial the number of the content provider computing device with the one of the first contact information or the second contact information responsive to a selection of the selectable button.

6. The system of claim 1, comprising the one or more processors to:
    determine a domain of the received URL;
    find a plurality of URLs under the domain, each of the plurality of URLs identifying a resource that is less than a predetermined number of arcs from the received URL; and
    load a plurality of resources identified by the plurality of URLs.

7. The system of claim 1, comprising the one or more processors to:
    parse the webpage into the object tree;
    render the webpage using the object tree; and
    detect the plurality of contact information using optical character recognition from the rendered webpage.

8. The system of claim 1, comprising the one or more processors to:
    filter a portion of the webpage; and
    detect the plurality of contact information from an unfiltered portion of the loaded webpage.

9. The system of claim 1, wherein each prominence score for each of the plurality of contact information comprises a weighted sum of a plurality of signals associated with a respective contact information.

10. The system of claim 9, wherein a signal of the plurality of signals is computed based on at least one of:
the number of times the respective contact information is shown on the loaded webpage;
the number of other contact information detected on the loaded webpage;
the typographic emphasis of a respective contact information;
the location of the contact information within the loaded webpage;
the text located near the respective contact information within the loaded webpage; or
a prominence of an image associated with the respective contact information referenced by the loaded webpage.

11. A method of web-based data extraction and linkage, comprising:
receiving, by a data processing system including one or more processors, a content item and uniform resource locator (URL) from a content provider computing device, the URL identifying a webpage;
loading, by the data processing system, the webpage identified by the URL;
detecting, by the data processing system, a plurality of contact information from the webpage, the plurality of contact information comprising a first contact information and a second contact information;
parsing, by the data processing system, to determine, prior to association of contact information with the content item, a prominence score for each of the plurality of contact information based on one or more signals associated with the plurality of contact information obtained via an analysis of an object tree of the webpage or an analysis of a result of optical character recognition of the webpage, wherein the one or more signals is based on:
a number of times the respective contact information is shown on the loaded webpage;
a number of other contact information detected on the loaded webpage;
a typographic emphasis of a respective contact information;
a location of the contact information within the loaded webpage; and
a text located near the respective contact information within the loaded webpage;
selecting, by the data processing system, the first contact information and the second contact information of the plurality of contact information based on the prominence score for each of the plurality of contact information;
associating, by the data processing system, the selected first contact information and the second contact information with the content item;
receiving, by the data processing system, via speech input from a computing device, a request;
selecting, by the data processing system based on location information associated with the computing device, one of the first contact information or the second contact information;
modifying, by the data processing system, the content item to indicate the one of the first contact information or the second contact information selected based on the location information associated with the computing device; and
providing, by the data processing system, the content item to the computing device to cause the computing device to generate audio output comprising the content item to indicate, via the audio output, the one of the first contact information or the second contact information selected based on the location information associated with the computing device, the computing device to dial a number of the content provider computing device with the one of the first contact information or the second contact information responsive to input from the computing device.

12. The method of claim 11, wherein the computing device comprises a digital assistant, the method comprising:
receiving the speech input from the digital assistant.

13. The method of claim 11, comprising:
dialing, by the computing device, the number of the content provider computing device responsive to a selection.

14. The method of claim 11, comprising:
dialing, by the computing device, the number of the content provider computing device responsive to audio feedback.

15. The method of claim 11, comprising:
modifying, by the one or more processors, for presentation via a second computing device, the content item to include the one of the first contact information or the second contact information with a selectable button for the content item; and
serving the content item with the selectable button to the second computing device responsive to the request, the second computing device configured to dial the number of the content provider computing device with the one of the first contact information or the second contact information responsive to a selection of the selectable button.

16. The method of claim 11, comprising:
determining, by the one or more processors, a domain of the received URL;
finding, by the one or more processors, a plurality of URLs under the domain, each of the plurality of URLs identifying a resource that is less than a predetermined number of arcs from the received URL; and
loading, by the one or more processors, a plurality of resources identified by the plurality of URLs.

17. The method of claim 11, comprising:
parsing, by the one or more processors, the webpage into the object tree;
rendering, by the one or more processors, the webpage using the object tree; and
detecting, by the one or more processors, the plurality of contact information using optical character recognition from the rendered webpage.

18. The method of claim 11, comprising:
filtering, by the one or more processors, a portion of the webpage; and
detecting, by the one or more processors, the plurality of contact information from an unfiltered portion of the loaded webpage.

19. The method of claim 11, wherein each prominence score for each of the plurality of contact information comprises a weighted sum of a plurality of signals associated with a respective contact information.

20. The method of claim 19, wherein a signal of the plurality of signals is computed using at least one of:

the number of times the respective contact information is shown on the loaded webpage;

the number of other contact information detected on the loaded webpage;

the typographic emphasis of a respective contact information;

the location of the contact information within the loaded webpage;

the text located near the respective contact information within the loaded webpage; or a prominence of an image associated with the respective contact information referenced by the loaded webpage.

* * * * *